F. O. LEWIS.
PROTECTOR FOR FLEXIBLE RADIATOR CONNECTIONS.
APPLICATION FILED MAY 13, 1918.

1,324,316.

Patented Dec. 9, 1919.

Inventor
F. O. Lewis.
By Lancaster Allwine
his Attorneys.

UNITED STATES PATENT OFFICE.

FRANCIS O. LEWIS, OF BARTOW, FLORIDA.

PROTECTOR FOR FLEXIBLE RADIATOR CONNECTIONS.

1,324,316.

Specification of Letters Patent.

Patented Dec. 9, 1919.

Application filed May 13, 1918. Serial No. 234,293.

*To all whom it may concern:*

Be it known that I, FRANCIS O. LEWIS, a citizen of the United States, and a resident of Bartow, in the county of Polk and State of Florida, have invented certain new and useful Improvements in Protectors for Flexible Radiator Connections, of which the following is a specification.

This invention relates to a shield or protector for the flexible connection between the radiator and water jacket of an automobile or motor vehicle, and an object of the invention is to provide a metal shield, composed of a pair of semi-cylindrical members having their edges overlapping which members are bound about the flexible connection or hose, between the radiator and water jacket of an engine of a motor vehicle, obviating the necessity of the employment of the ordinary type of hose clamps employed for connecting the hose to the radiator and water jacket, and also providing a shield or protector for the hose, to prevent the accumulation of oil or other deteriorating substance upon the hose, consequently increasing the longevity of the hose and eliminating the inconveniences contingent with the rotting of the hose or flexible connection.

Other objects of the invention will appear in the following detailed description, taken in connection with the accompanying drawing, forming a part of this specification, and in which drawing.

Figure 1:
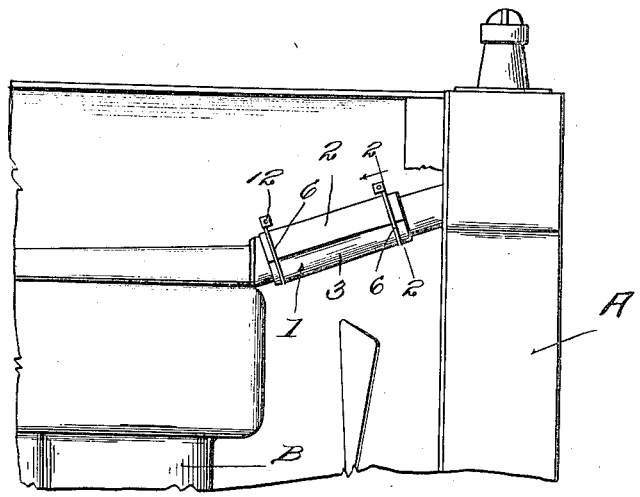
Figure 1 is a fragmentary view of a motor vehicle showing the improved shield or protector mounted upon the flexible connection with the radiator and water jacket of the engine or motor of the motor vehicle.

Referring more particularly to the drawing, A designates the radiator of any ordinary type of motor vehicle, and B indicates the motor or engine thereof which is surrounded by a water jacket and which water jacket has communication with the radiator to permit the water circulation through the radiator and water jacket through a hose or flexible connection C.

Figure 2:
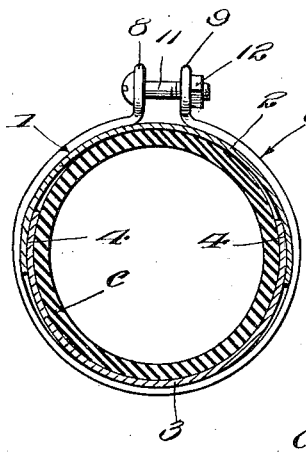
Fig. 2 is a section on the line 2—2 of Fig. 1.
Figure 3:
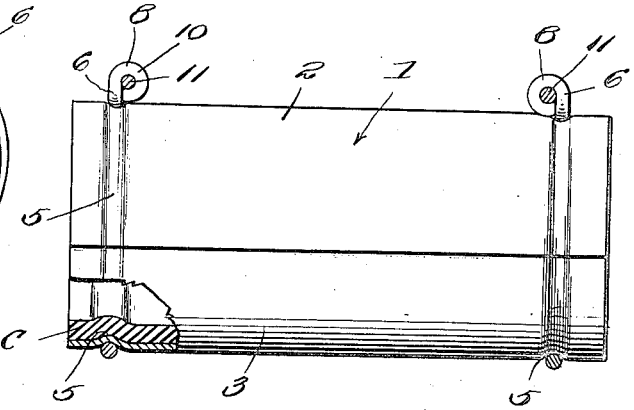
Fig. 3 is a side elevation of the protector showing parts thereof in section.

The improved shield for the flexible pipe or hose C is generically indicated by the numeral 1, and it comprises a pair of semi-cylindrical metal shells 2 and 3, the edges of which overlap as shown at 4 in Fig. 2 of the drawing. The semi-cylindrical shells 2 and 3 are provided with annular instruck portions 5 near their ends, and the instruck portions of the member 2, the edges of which extend over the edges of the shell 3 engage in the depression formed in the outer surface of the member 3 when providing the instruck portions 5. A pair of resilient clamping members 6 are provided, one of which is mounted at each end of the protector and engages in the channel formed by the striking inwardly of the portion 5. The clamps 6 are each formed of a single strand of wire, bent to extend about the connected shells 2 and 3 and they have their end portions bent outwardly tangentially of the substantially circular portions thereof. The outwardly bent end portions 8 and 9 of each of the clamp structures are disposed in parallel relation, and are rolled to form eyes 10 through which a bolt 11 extends. A nut 12 is mounted upon the bolt 11 and by adjusting the position of the nut upon the bolt, the clamping members may be bound tightly about the semi-cylindrical shell sections to securely connect these sections and clamp them about the hose or flexible connection C.

By using the improved shield or protector heretofore described, the clamps 6 thereof will also securely clamp the flexible connection to the radiator and engine coupling so that the use of the ordinary clamp may be dispensed with.

The overlapping of the longitudinal edges of the shells 2 and 3 is such, as to permit limited movement of one shell independently of the other, to provide sufficient flexibility to the protector for the flexible connection between the motor B and the radiator A, to prevent breakage of the joints or couplings or in case of movement of the motor or radiator independently of each other.

Having fully described the invention, what is claimed is:

1. A protector for flexible radiator connections comprising a pair of substantially semi-cylindrical sheet metal shells having their edges overlapping to permit limited relative lateral movement of the shells, and means to prevent relative longitudinal movement of the shells.

2. A protector for flexible radiator connections comprising a pair of substantially semi-cylindrical shells having their edges overlapping to permit limited lateral relative movement of the shells, and flexible clamping members mounted about said shells adjacent their ends for maintaining the shells about the flexible connection and in proper relation to each other.

3. A protector for flexible radiator connections comprising a pair of substantially semi-cylindrical sheet metal shells having their edges overlapping to permit limited relative lateral movement of the shells, said shells provided with registering instruck portions adjacent their ends, the instruck portions of the overlapping ends of said shells inter-engaging to prevent relative longitudinal movement of the shells.

4. A protector for flexible radiator connections comprising a pair of substantially semi-cylindrical sheet metal shells having their edges overlapping to permit limited relative lateral movement of the shells, said shells provided with registering instruck portions adjacent their ends, the instruck portions of the overlapping ends of said shells inter-engaging to prevent relative longitudinal movement of the shells, and adjustable clamps mounted about said shells and engaging in the depression formed by said instruck portions.

FRANCIS O. LEWIS.